United States Patent [19]

Joulin

[11] 4,287,215
[45] Sep. 1, 1981

[54] BRAN BREAD AND METHOD FOR MAKING SAME

[76] Inventor: Gérard Joulin, 44 rue de Pontoise, 95870 Bezons, France

[21] Appl. No.: 952,586

[22] Filed: Oct. 18, 1978

[30] Foreign Application Priority Data

Oct. 21, 1977 [FR] France .................. 77 31711

[51] Int. Cl.³ .......................... A21D 13/02
[52] U.S. Cl. ...................... 426/19; 426/31; 426/618; 426/622; 426/549
[58] Field of Search .............. 426/19, 549, 31, 615, 426/618, 622, 463

[56] References Cited

FOREIGN PATENT DOCUMENTS 2446872 4/1976 Fed. Rep. of Germany ........... 426/615

OTHER PUBLICATIONS

Richards "Bread, Rolls and Sweet Doughs", Bakers' Helper Co., Chicago, 1923, pp. 100-101.
Sherman, "Food Products", Macmillan Co., N.Y., 1948, pp. 196-202.

Primary Examiner—Joseph M. Golian
Assistant Examiner—Elizabeth A. Hatcher
Attorney, Agent, or Firm—Fisher, Christen & Sabol

[57] ABSTRACT

The invention relates to a method for making bran bread by preparing a dough based on wheat flour, bran and water, which is subjected to baking after fermentation, the said wheat flour being of the type comprising at least 12% to 13% by weight of proteins and the bran being obtained from wheat ground by a millstone. The invention is more particularly applicable to the making of dietetic bran bread.

7 Claims, No Drawings

BRAN BREAD AND METHOD FOR MAKING SAME

The present invention relates to bran bread and to a method for making same.

Known bran bread is generally difficult to digest, is of unappetizing appearance and of mediocre taste.

The present invention relates to a method for making bran bread which is easy to digest, pleasant to eat and has dietetic properties which are particularly advantageous in the case of intestinal disorders, as well as to the bread obtained by carrying out this method. Clinical tests on patients have shown that in 93% of the cases, the patients feces become normal after from two to three days of ingestion of bread according to the invention.

To this end, according to the invention, the method for obtaining bran bread by preparation of a dough based on wheat flour, bran and water, which is subjected to baking after fermentation, is noteworthy in that said wheat flour is of the type comprising from at least 12 to 13% by weight of proteins and in that the bran is obtained from wheat ground by a millstone.

Applicants have in fact surprising found that the combination of a wheat flour rich in proteins and of bran obtained by grinding by a millstone enabled a bran bread to be obtained presenting the advantageous features mentioned hereinabove. The wheat from which the flour is made is preferably of the so-called MANITOBA or AMERICAN type, which normally comprises about 14% by weight of proteins.

The wheat from which the bran is obtained may either be wheat rich in proteins or ordinary wheat of which the flour comprises only 11% by weight of proteins. It is, however, advantageous if this wheat is cultivated and conserved without chemical products.

The most important point concerning the bran is that it is obtained by being crushed by a millstone, i.e. by passage between two discs, generally made of stone, the edges of which are provided with projections and complementary recesses and roll on each other. The wheat is advantageously crushed dry.

It is known that, for reasons of economy, crushing of wheat by the millstone has been abandoned for a long time and replaced by crushing by means of cylinders acting as a rolling mill. To avoid obtaining a "spotted" flour, the wheat treated by the cylinders is previously humidified. The bran obtained by these two methods is different; the bran coming from crushing by cylinders is pure, without particles of flour, and it is smooth in appearance, whilst the bran coming from crushing by a millstone comprises protein particles and its appearance is "frizzled". The bran obtained by the millstone is richer in protein and in minerals and it is thicker.

It appears that these differences are capital for the quality of the bran bread according to the invention. Moreover, after grinding by the millstone, the bran is sieved to keep only the particles of average dimensions (e.g. between 0.5 mm and 1 mm) this seeming favourable for the purpose; in fact, the average bran gives good results whilst the fine bran is without effect and the large bran irritates the intestinal wall.

An embodiment of the bran bread according to the invention is described hereinafter by way of non-limitating example.

In this embodiment, a dough is made, of which the composition in grams is as follows:

| | |
|---|---|
| - MANITOBA wheat flour(14% by weight of proteins) | 100 |
| - Bran obtained by grinding wheat with 11% by weight of proteins by a millstone | from 20 to 30 |
| - dry gluten | from 5 to 10 |
| - salt | as usual |
| - lard | from 2,5 to 4 |
| - fat (compound) | from 2,5 to 4 |
| - yeast | from 5 to 10 |
| - calcium propionate (conserving agent) | from 0,4 to 1 |
| - malt | from 0,5 to 1 |
| - sugar | from 1,5 to 2,5 |
| - water | 100 |

To make this dough, one starts by mixing the salt, gluten, calcium propionate and the sugar and the mixture is placed in a kneading trough. Water is poured into said trough, then the flour and bran are poured on the water. The malt and yeast are then placed on the flour and the kneading machine is switched on. After kneading, i.e. after a rough mixing of the different ingredients, the lard and the fat (compound) are incorporated.

The dough is then weighed and divided into loaves, which are subjected in known manner to prefermentation, fermentation and baking. Appetizing bran bread is then obtained, having dietetic properties.

I claim:

1. A method for obtaining bran bread by preparation of a dough based on wheat flour, bran and water, which is subjected to baking, after fermentation with yeast, wherein said wheat flour is of the type comprising at least 12% by weight of proteins, the bran being obtained from said wheat flour ground by a millstone and which after grinding, has been sieved to keep only the particles of dimensions between 0.5 and 1 mm.

2. A method as claimed in claim 1, wherein the wheat from which the flour is made is of the type comprising of the order of 14% by weight of proteins.

3. A method as claimed in claim 1, wherein the wheat from which the bran is obtained is a wheat rich in proteins.

4. A method as claimed in claim 1, wherein the wheat from which the bran is obtained is a wheat comprising only about 11% by weight of proteins.

5. A method as claimed in claim 1, wherein the bran is obtained from wheat cultivated and conserved without chemical products.

6. A method as claimed in claim 1, wherein the grinding of the wheat by the millstone, for obtaining the bran, is effected dry.

7. Bran bread obtained by carrying out the method as claimed in any one of the preceding claims 1, 2, 3, 4, 5 or 6.

* * * * *